United States Patent Office 3,514,006
Patented May 26, 1970

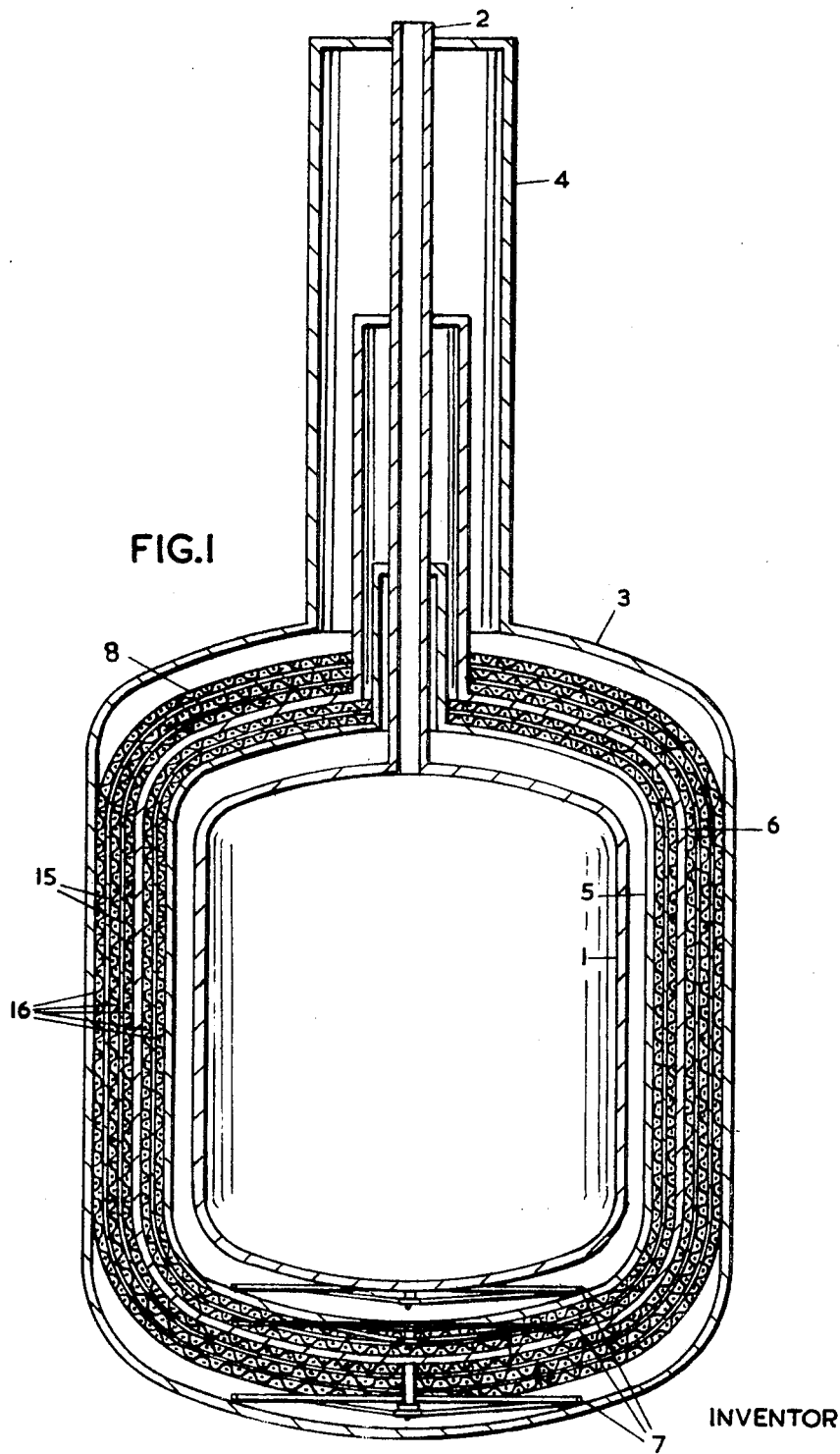

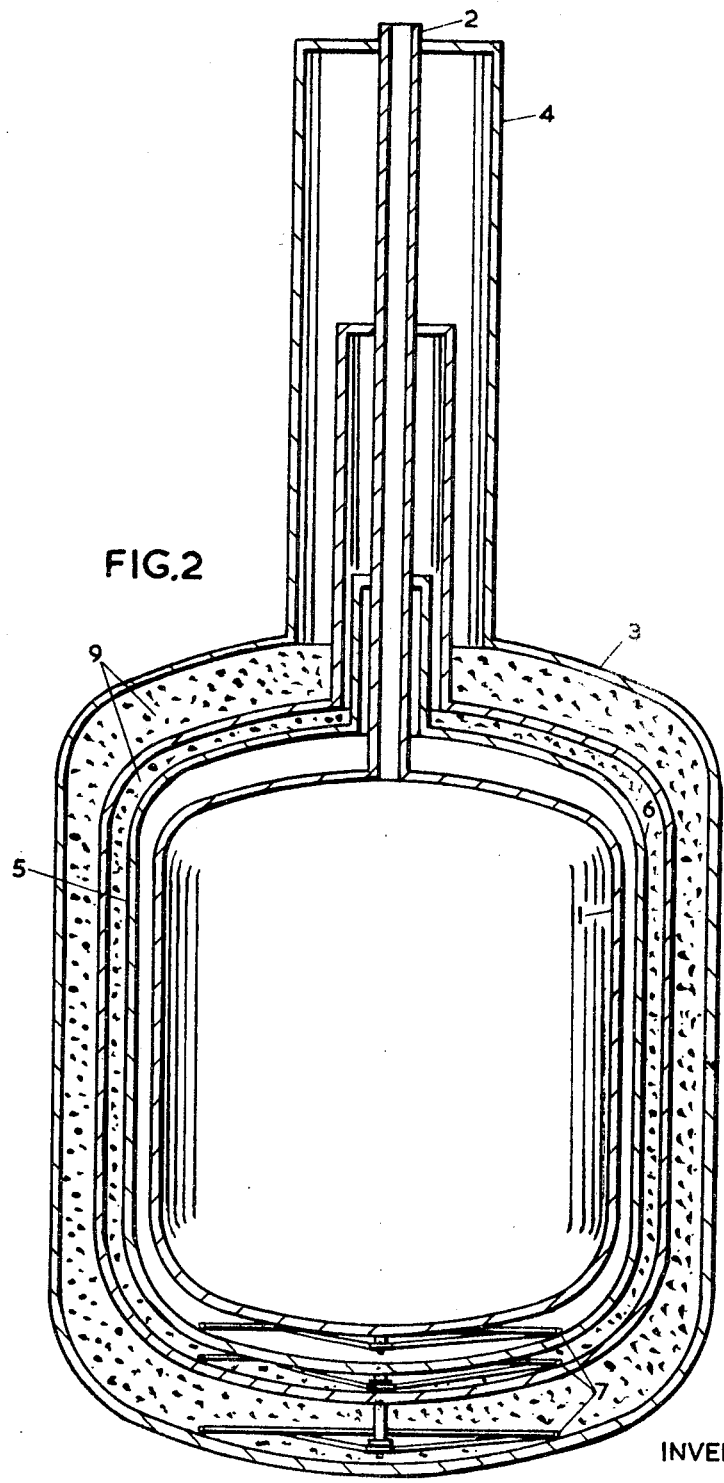

3,514,006
VACUUM INSULATED VESSELS
William Molnar, Southfields, England, assignor to The British Oxygen Company Limited, a British company
Filed May 9, 1967, Ser. No. 637,141
Claims priority, application Great Britain, May 19, 1966, 22,257/66
Int. Cl. B65d 25/00
U.S. Cl. 220—14               4 Claims

ABSTRACT OF THE DISCLOSURE

A vacuum insulated vessel for the storage and transport of low temperature materials comprises an inner container separated from an outer shell by an evacuated inter-space, and at least one gas-cooled shield located in the inter-space by attachment to the neck of the inner container. The space between the inner container and its adjacent gas-cooled shield is left void, and the space between the outer shell and its adjacent gas-cooled shield is filled with an insulant. The insulant may be of the wrapped type comprising layers of low conductive material alternating with layers of heat reflective sheet material or alternatively, may be formed of a powderous material. If more than one gas-cooled shield is used the space or spaces between the shields may be filled with insulant or left void as required.

---

The present invention relates to vacuum insulated vessels generally known as Dewar vessels which are used for storing low boiling point liquefied gases.

The conservation of low boiling point gases, and in particular those gases having very low boiling points such as for example liquid helium and liquid hydrogen, necessitates the use of vacuum insulated storage vessels having highly efficient insulation.

These storage vessels comprise an inner liquid container and an outer shell spaced from the inner container, the interspace being evacuated. One or more heat radiation shields are mounted in the interspace in spaced relationship with respect to one another and to the inner vessel and outer shell.

In some known constructions the spaces between the shields and the vessel have been left void; and in other cases these spaces have all been filled with a low conductive material which serves both to impede the conduction of heat, and also to support the radiation shields.

In order to improve the insulation efficiency of the vessels, gas which escapes from the inner container is utilised to cool at least some of the radiation shields. In order to achieve this the shields are connected at spaced intervals to the upper end or neck of the inner container in such a manner as to ensure good thermal contact with the neck. The innermost shield is attached to the lowest part of the neck, the next innermost shield is attached to a higher part of the neck and so on. These shields, when cooled in this manner, are hereinafter referred to as gas-cooled shields.

Vacuum insulated vessels constructed in this manner will be hereinafter referred to as vacuum insulated vessels of the type described.

According to the present invention there is provided a vacuum insulated vessel of the type described in which the space between the inner container and its adjacent gas-cooled shield is void, and the space between the outer shell and its adjacent gas-cooled shield is filled with an insulant which does not support the shield.

If more than one shield is used the space or spaces between the shields may be filled with insulant or left void as required, but it is to be understood that no shield is supported by insulant.

The preferred insulant is of the wrapped foil type, as hereinafter described.

The following table gives an indication of various different constructions of vessel.

| Number of shields | Number of spaces (total) | Number of spaces unfilled | Number of spaces with insulant | |
|---|---|---|---|---|
| 1 | 2 | 1 | 1 | |
| 2 | 3 | 1 | 2 | Preferred. |
| 2 | 3 | 2 | 1 | |
| 3 | 4 | 1 | 3 | |
| 3 | 4 | 2 | 2 | Do. |
| 4 | 5 | 1 | 4 | |
| 4 | 5 | 2 | 3 | Do. |
| 5 | 6 | 1 | 5 | |
| 5 | 6 | 2 | 4 | Do. |
| 5 | 6 | 3 | 3 | |

As previously mentioned, the shields are not supported by insulant. These shields are either self supporting by their attachment to the neck of the inner container or else they are supported by an arrangement such as for example, the spider member described in U.S. patent application 3,191,795. The shields can also act as a support for the insulant.

The insulant may of any conventional known type, for example, a powderous material or a material of the wrapped foil type comprising layers of low conductive material alternating with layers of heat reflective sheet material.

Two embodiments of the invention will now be described by way of example, and with reference to the accompanying drawing in which FIGS. 1 and 2 are two different types of vacuum insulated Dewar vessel.

Referring to the FIG. 1 the vessel comprises an inner liquid container having a body 1 of generally cylindrical shape and a long neck 2, and an outer shell 3 having a neck portion 4. The outer shell 3 and neck portion 4 are dimensioned and shaped so as to surround and be spaced from the body 1 and neck 2 of the inner container, both the inner container and outer shell being made of stainless steel or other suitable material.

The walls of the inner container and outer shell define a vacuum space between them and two gas-cooled shields 5 and 6 made of sheet copper are mounted in spaced relationship to one another in this vacuum space. These shields are of the same general shape as the inner container so as to surround the body and part of the neck 2 with the inner shield 5 secured to the lower portion of the neck 2, and the outer shield mounted further up the neck 2.

The spaces between the shields 5 and 6, and between the outer shield 6 and the outer shell 3 are filled with an insulant 8 of the wrapped foil type in which a single sheet of aluminum foil is wound spirally about the shields 5 and 6 to form a plurality of layers 15 which are separated from each other and from the wall of the outer shell 3 by layers of polyester fibre netting 16 also spirally wound. The shields 5 and 6 are not supported in any way by the insulant, on the contrary they themselves support the insulant. The space between the inner liquid container and the inner shield 5 is left empty.

The shields 5 and 6 are each made in three parts; the neck and upper domed end, the central cylindrical portion and the lower domed end.

The vessel is assembled by brazing together the container 1 and the upper domed end and the cylindrical portion of the inner shield 5. The lower domed end of the shield 5 is then brazed to the cylindrical portion and the insulant 8 wrapped round the outside of the shield 5. The shield 6 is assembled in the same way and the insulant 8 is wrapped round the outside of the shield 6. Then the neck portion 4 is brazed to the domed cylindrical portion of the outer shell 3 and finally the neck portion is brazed to the neck 2.

In this vessel the shields 5 and 6 can be supported entirely by their attachment to the neck 2 but to provide a more rigid construction the shields are generally further supported by spider members 7 of the type described in U.S. patent specification No. 3,191,795.

In FIG. 2 there is illustrated a vacuum insulated Dewar vessel similar in construction to that illustrated in FIG. 1 except that instead of filling the spaces between the shields 5 and 6, and between the outer shield 6 and the outer shell 3 with an insulant of the wrapped foil type, an insulant 9 consisting of a powderous material is used. As the powderous material there may be used an aerogel of silica or, more preferably, an aerogel derived from a metal oxide having a refractive index of at least 1.7, or an aerogel derived from a mixture of such metal oxides. Examples of suitable metal oxides are titanium dioxide (refractive index 2.5–2.9), iron oxide (refractive index 2.9), chromium oxide (refractive index 2.5) and copper oxide (refractive index 2.7).

It is found that a Dewar vessel of the type illustrated in FIGS. 1 and 2 sustains a smaller gas loss than vessels in which all the spaces are filled with insulant.

The improvement achieved is indicated in the table below, which shows the relative losses of liquid helium from an ordinary Dewar vessel (no shields or insulation), a Dewar vessel with gas-cooled shields, with all vacuum spaces filled with insulant, and vessels constructed in accordance with the invention in which the space between the inner vessel and the inner shield contains no insulant, but the other spaces are filled:

| | Relative rate of helium loss | | |
|---|---|---|---|
| No. of shields | Ordinary Dewar | Insulant in all vacuum spaces | Present invention |
| 0 | 1 | | |
| 1 | | 0.17 | 0.062 |
| 2 | | | 0.043 |
| 5 | | 0.057 | |

A vessel with only two gas-cooled shields, constructed in accordance with our invention is superior to a vessel with five shields, using layered insulant in all six vacuum spaces.

I claim:

1. A vacuum insulated vessel for the storage and transport of low temperature materials such as very low boiling point liquefied gases comprising an inner container provided with a neck portion, an outer shell spaced from the inner container and sealingly connected to said neck portion to define therewith a vacuum space, and at least one self-supporting gas-cooled shield mounted within the vacuum space in spaced relation to both said inner container and said outer shell and with a portion of said shield heat conductively connected to said inner container neck portion, the space between the inner container and the adjacent gas-cooled shield being void and the space between the outer shell and the adjacent gas-cooled shield being filled with an insulant of the wrapped type comprising layers of low conductive material alternating with layers of heat reflective sheet material.

2. A vacuum insulated vessel for the storage and transport of low temperature materials such as very low boiling point liquefied gases comprising an inner container provided with a neck portion, an outer shell spaced from the inner container and sealingly connected to said neck portion to define therewith a vacuum space and a plurality of self-supported gas-cooled shields mounted within the vacuum space in spaced relation to each other and in spaced relation to both said inner container and said outer shell with a portion of each shield heat conductively connected to said inner container neck portion, the space between the inner container and the adjacent gas-cooled shield being void and the space between the outer shell and the adjacent gas-cooled shield and the the space between adjacent gas-cooled shields being filled with an insulant of the wrapped type comprising low conductive material alternating with layers of heat reflective sheet material.

3. A vacuum insulated vessel for the storage and transport of low temperature materials such as very low point boiling point liquefied gases comprising an inner container provided with a neck portion, an outer shell spaced from the inner container and sealingly connected to said neck portion to define therewith a vacuum space, and at least one self-supporting gas-cooled shield mounted in the vacuum space in spaced relation to both said inner container and said outer shell and with a portion of said shield heat conductively connected to said inner container neck portion, the space between the inner container and the adjacent gas-cooled shield being void and the space between the outer shell and the adjacent gas-cooled shield being filled with an insulant formed of a powderous material.

4. A vacuum insulated vessel for the storage and transport of low temperature materials such as very low boiling point liquified gases comprising an inner container provided with a neck portion, an outer shell spaced from the inner container and sealingly connected to said neck portion to define therewith a vacuum space, and a plurality of self-supporting gas-cooled shields mounted within the vacuum space in spaced relation to each other and in spaced relation to both said inner container and said outer shell with a portion of each shield heat conductively connected to said inner container neck portion, the space between the inner container and the adjacent gas-cooled shield being void and the space between the outer shell and the adjacent gas-cooled shield and the space between adjacent gas-cooled shields being filled with an insulant formed of a powderous material.

References Cited

UNITED STATES PATENTS

| | | |
|---|---|---|
| 1,088,194 | 2/1914 | Whitton. |
| 1,424,604 | 8/1922 | Weber. |
| 2,643,022 | 6/1953 | Cornell _____ 220—15 |
| 2,776,776 | 1/1957 | Strong et al. |
| 3,009,601 | 11/1961 | Matsch. |
| 3,119,238 | 1/1964 | Chamberlain et al. |
| 3,191,795 | 6/1965 | Molnar _____ 220—14 |
| 3,272,374 | 9/1966 | Loveday et al. _____ 220—14 |

FOREIGN PATENTS 180,082    5/1922    Great Britain.

JOSEPH R. LECLAIR, Primary Examiner

J. R. GARRETT, Assistant Examiner